(12) United States Patent
Hashimoto

(10) Patent No.: US 10,342,176 B2
(45) Date of Patent: Jul. 9, 2019

(54) ANGLED SENSOR BAR FOR DETECTING PLANTS

(71) Applicant: Monsanto Technology LLC, St. Louis, MO (US)

(72) Inventor: Harry Hitoshi Hashimoto, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 32 days.

(21) Appl. No.: 15/643,528

(22) Filed: Jul. 7, 2017

(65) Prior Publication Data

US 2018/0014463 A1    Jan. 18, 2018

Related U.S. Application Data

(60) Provisional application No. 62/361,609, filed on Jul. 13, 2016.

(51) Int. Cl.
*A01D 47/00* (2006.01)
*A01H 1/02* (2006.01)

(52) U.S. Cl.
CPC ............... *A01D 47/00* (2013.01); *A01H 1/02* (2013.01)

(58) Field of Classification Search
CPC . A01M 7/0057; A01M 7/0089; A01B 63/008; A01B 41/06; A01B 69/00; A01B 69/008; A01B 71/02; A01B 79/02; A01D 47/00; A01D 45/003; A01D 45/00
USPC .......................................................... 701/50
See application file for complete search history.

(56) References Cited

U.S. PATENT DOCUMENTS

| | | | | |
|---|---|---|---|---|
| 3,708,016 A | * | 1/1973 | Shader | A01B 41/06 171/58 |
| 3,710,564 A | * | 1/1973 | Sammann | A01D 47/00 171/58 |
| 3,724,184 A | * | 4/1973 | Wright | A01D 47/00 56/51 |

(Continued)

FOREIGN PATENT DOCUMENTS

WO    2016025848 A1    2/2016

*Primary Examiner* — Arpad Fabian-Kovacs
(74) *Attorney, Agent, or Firm* — Sandberg Phoenix & van Gontard P.C

(57) ABSTRACT

A detasseler system mountable to a mobile platform, wherein the system comprises a lift assembly and a detasseling assembly connected to the lift assembly. The detasseling assembly structured and operable to detassel the plants in a single row of plants in a test plot as the detasseler system is moved through the test plot. The detasseling assembly comprises a head assembly comprising a carrier bar connected to the lift assembly, a cutter head disposed at a first distal end of the carrier bar, and a puller head disposed at an opposing second distal end of the carrier bar. The detasseling assembly additionally comprises a sensor boom fixedly connected at a proximal end to the lift assembly, and an angled sensor bar assembly connected to sensor boom. The angled sensor bar assembly comprises an sensor bar connected to the sensor boom at an angle such that a non-orthogonal angle is defined between the sensor bar and the sensor boom; and a sensor system connected to the angle sensor bar, the sensor system structured and operable to detect the presence of a plant with a sensing field of the sensor system.

19 Claims, 10 Drawing Sheets

(56) References Cited

U.S. PATENT DOCUMENTS

| | | | | |
|---|---|---|---|---|
| 3,727,332 A * | 4/1973 | Zimmer | ................... | E02F 3/18 |
| | | | | 172/4.5 |
| 3,736,730 A * | 6/1973 | Dobson | ................. | A01D 47/00 |
| | | | | 171/58 |
| 4,258,537 A * | 3/1981 | Christman | ............. | A01D 47/00 |
| | | | | 56/51 |
| 5,661,964 A * | 9/1997 | Paulson | ............... | A01D 45/021 |
| | | | | 460/36 |
| 7,694,501 B1 * | 4/2010 | Hinds | .................... | A01D 47/00 |
| | | | | 56/62 |
| 7,805,916 B2 * | 10/2010 | Hinds | ................... | A01D 47/00 |
| | | | | 56/62 |
| 2008/0155953 A1 * | 7/2008 | Cleodolphi | .......... | A01D 41/141 |
| | | | | 56/10.2 E |
| 2012/0304610 A1 * | 12/2012 | Dunn | .................... | A01D 47/00 |
| | | | | 56/17.1 |
| 2013/0345937 A1 * | 12/2013 | Strelioff | .............. | A01M 7/0057 |
| | | | | 701/50 |
| 2017/0105343 A1 * | 4/2017 | Jonckheere | ............ | A01D 47/00 |
| 2017/0223947 A1 * | 8/2017 | Gall | .................... | A01M 7/0089 |
| 2017/0251589 A1 * | 9/2017 | Tippery | ................. | A01G 22/00 |
| 2017/0303470 A1 * | 10/2017 | Briquet-Kerestedjian | ................. | |
| | | | | A01B 63/10 |
| 2018/0199502 A1 * | 7/2018 | Briquet-Kerestedjian | ................. | |
| | | | | A01B 63/008 |
| 2018/0279556 A1 * | 10/2018 | Briquet-Kerestedjian | ................. | |
| | | | | A01B 63/008 |

* cited by examiner

ANGLED SENSOR BAR FOR DETECTING PLANTS

CROSS-REFERENCE TO RELATED APPLICATIONS

This application claims the benefit of U.S. Provisional Application No. 62/361,609, filed on Jul. 13, 2016. The disclosure of the above application is incorporated herein in its entirety.

FIELD

The present teachings relate to systems and method for detasseling corn in a test plot for crop analytics and breeding purposes. More particularly, the present teachings relate to detasseling system having an angled sensor bar used to control the height of the system cutter and puller.

BACKGROUND

The statements in this section merely provide background information related to the present disclosure and may not constitute prior art.

To research and develop various strains, hybrids, genotypes of corn, seed producers engineer, plant, grow, pollinate, cross-pollinate and analyze many different varieties of seed. Typically for such research, a single field is subdivided into multiple research, or test, plots, each containing plants with distinct germplasm-treatment combinations. Each test plot typically comprises one or more rows of plants comprising 5-15 plants in each row, and is purposely separated by a gap, or alleys, of no plants to maintain the identity of the plant material within each respective test plot. Hence, there are typically many alleys in a research field, often comprising 10-30 feet of space with no plants.

In various instances, in order to control the type of pollen present in a growing area, the tassels of certain corn plants are removed to prevent those plants from producing pollen. Removal of the tassels is typically referred to as detasseling. Automated systems and methods have been developed to perform the detasseling process. These systems/methods typically employ a mobile platform that traverses the test plot(s) a first time to cut off the leaves of the top portion of the corn plants, then traverses the test plot(s) a second time, after the tassels have started to emerge past the cut leaves (e.g., 24 to 48 hours later), to pull the tassels off/from of the plants.

In known systems, to cut the top portions off the corn plants, a cutter assembly (referred to as the cutter head) is mounted to the mobile platform and the mobile platform is moved through the respective test plot(s), whereby the cutter head cuts off the top portion of the plants. Typically, to automatically control the height above the ground of the cutter head, so that only a desired amount of the top portion of each corn plant is cut off, the system includes a sensor assembly. Typically, the sensor assembly is connected to a boom arm that positions the sensor assembly a distance (e.g., the length of the boom arm, e.g., 2-3 feet) in front of the cutter head, so that the sensor assembly theoretically senses the height of the next plant in the row to be cut. Specifically, the sensor assembly theoretically senses the height of the single plant located a distance (e.g., the length of the boom arm, e.g., 2-3 feet) in front of the plant currently being cut, whereafter the height of the cutter head is quickly adjusted so that the top portion of the next plant in the row is cut off.

Generally, the mobile platform moves through test plot at a desired speed (e.g., 3-8 mph) such that the height of the cutter head must be quickly adjusted based on the sensed height of the next plant in the row. However, due to the quick adjustment, when the next plant in the row is sensed to be shorter than the present plant being cut, or in various instances is missing, the cutter head will lower, or drop, before it has completed cutting the top off the present plant, resulting in the present plant (e.g., the plant prior to the sensed shorter plant) being cut lower than desired. That is, in such instances, due to the cutter head being lowered quickly, too much of the present plant will be cut off. Additionally, when the mobile platform comes to the end of a row (e.g., an alley) where no further plants are growing, which is frequent with small test plots, the sensor assembly will sense the absence of a plant, resulting in the cutter head being quickly lowered, thereby cutting the last plant(s) in the row too short.

In instances where the next plant to be cut is taller than the present plant being cut, the cutter head will be lifted, or raised, before it has completed cutting the top off the present plant, resulting in the present plant not having enough, if any, of the top portion cut off. That is, in such instances, due to the cutter head being lifting quickly, not enough of the top portion of the present plant will be cut off such that the respective tassel may not be properly exposed and be unable to be removed by the puller.

Additionally, in known systems, once the top portions of the plants have been cut off, the cutter head must be physically removed from the mobile platform and replaced with a puller assembly (referred to as the puller head). Subsequently, the mobile platform is moved through the respective test plot(s), whereby the puller head pulls the tassels out/off of the respective plants. As with the cutter head, the height of the puller head is controlled by the sensor assembly connected to the boom arm. Typically, in order to remove the cutter head or the puller head, and replace it with a respective puller head or a cutter head, the mobile platform must be removed from the field (e.g., driven to a maintenance shop) where the respective head can be removed from the mobile platform, stored, and replaced. Physically removing the cutter head or the puller head and replacing it with the respective puller head or cutter head is laborious and time consuming.

SUMMARY

In various other embodiments, the present disclosure provides a plant height measurement system mountable to a mobile platform, wherein the system comprises a lift assembly and a height measuring assembly connected to the lift assembly. The height measuring assembly structured and operable to identify the top of plants in a single row of plants in a test plot as the system is moved through the test plot. The height measuring assembly comprises a sensor boom fixedly connected at a proximal end to the lift assembly, and an angled sensor bar assembly connected to sensor boom. The angled sensor bar assembly comprises a sensor bar connected to the sensor boom at an angle such that a non-orthogonal angle is defined between the sensor bar and the sensor boom; and a sensor system connected to the angle sensor bar, the sensor system structured and operable to detect the presence of a plant within a sensing field of the sensor system.

In various other embodiments, the present disclosure provides a detasseler system mountable to a mobile platform, wherein the system comprises a lift assembly and a detasseling assembly connected to the lift assembly. The detasseling assembly structured and operable to detassel the plants in a single row of plants in a test plot as the detasseler system is moved through the test plot. The detasseling assembly comprises a head assembly comprising a carrier bar connected to the lift assembly, a cutter head disposed at a first distal end of the carrier bar, and a puller head disposed at an opposing second distal end of the carrier bar. The detasseling assembly additionally comprises a sensor boom fixedly connected at a proximal end to the lift assembly, and an angled sensor bar assembly connected to sensor boom. The angled sensor bar assembly comprises an sensor bar connected to the sensor boom at an angle such that a non-orthogonal angle is defined between the sensor bar and the sensor boom; and a sensor system connected to the angle sensor bar, the sensor system structured and operable to detect the presence of a plant with a sensing field of the sensor system.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
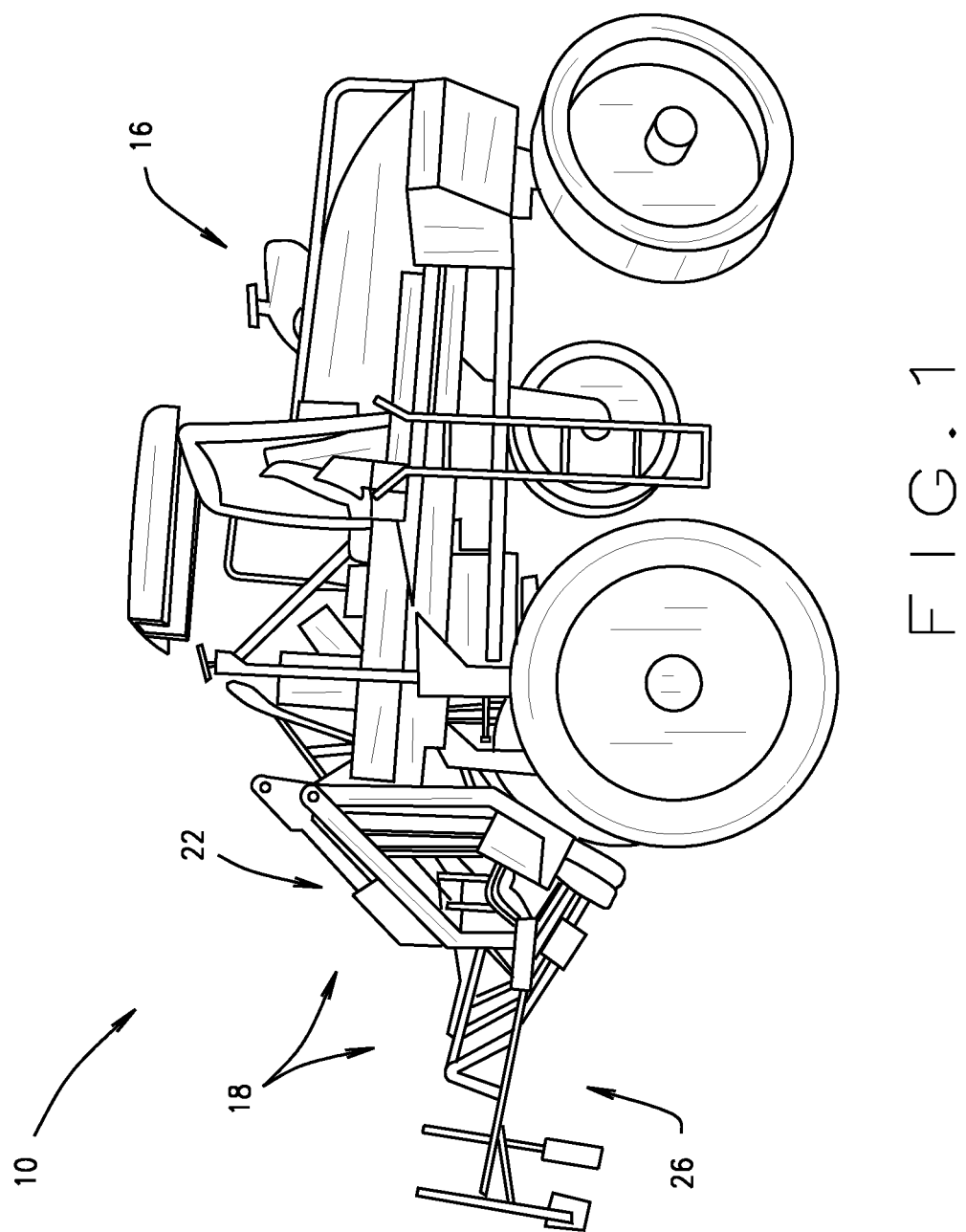
FIG. 1 is side view of a mobile system for detasseling plants in a test plot, in accordance with various embodiments of the present disclosure.
Figure 2:
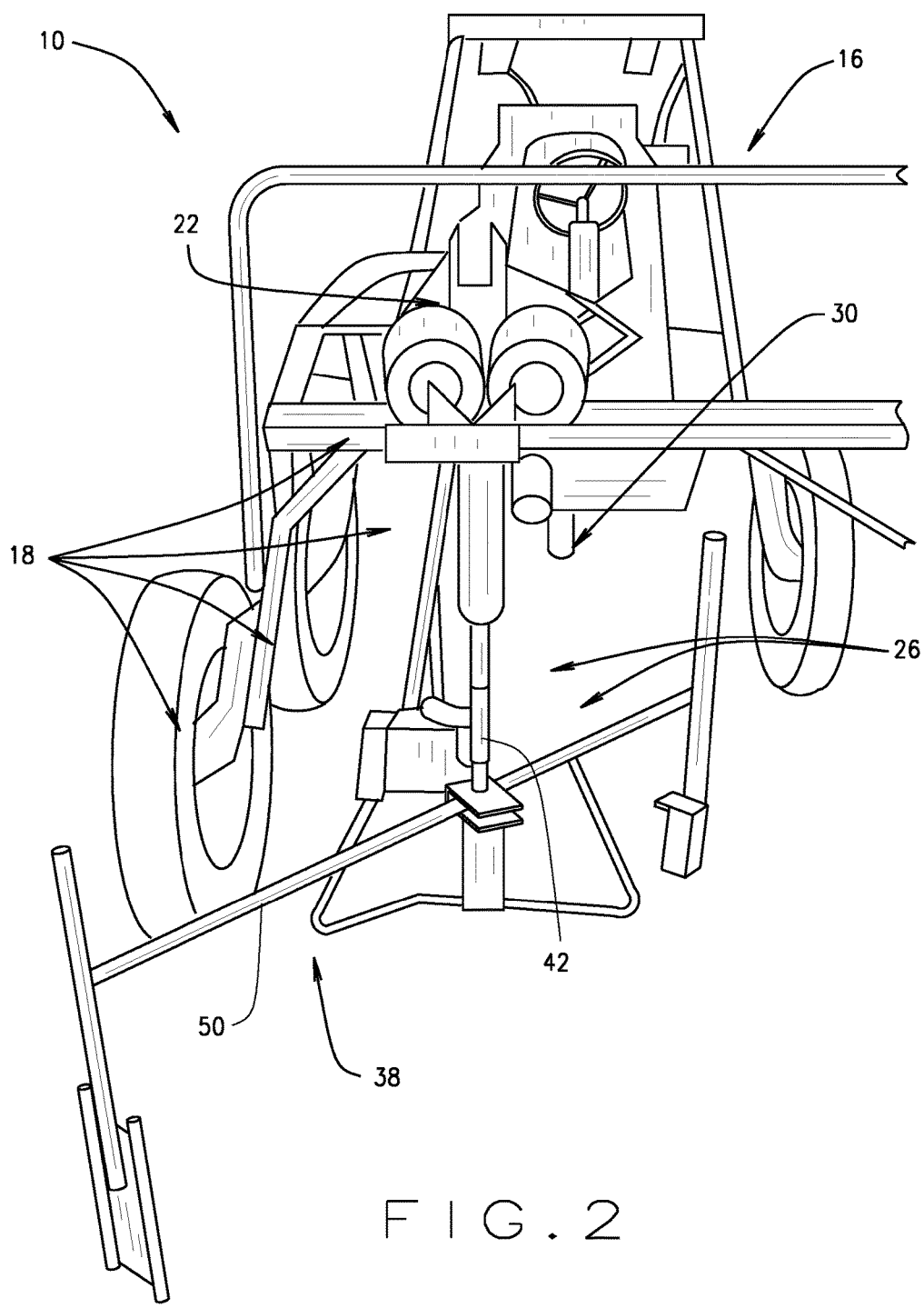
FIG. 2 is a front view of the mobile system for detasseling plants in a test plot shown in FIG. 1, in accordance with various embodiments of the present disclosure.
Figure 3:
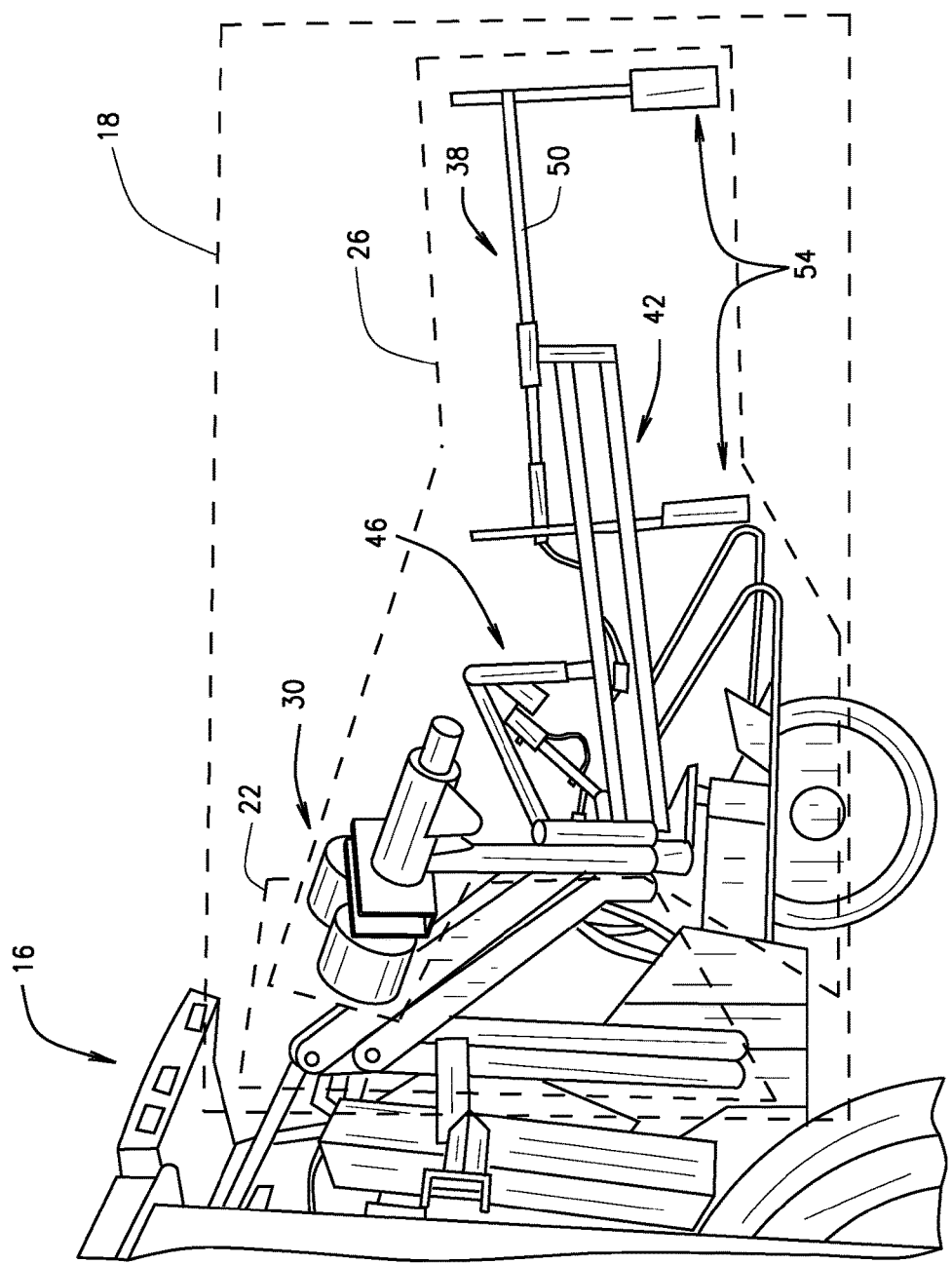
FIG. 3 is an isometric view of a detasseler system of the mobile system shown in FIGS. 1 and 2, in accordance with various embodiments of the present disclosure.
Figure 4:
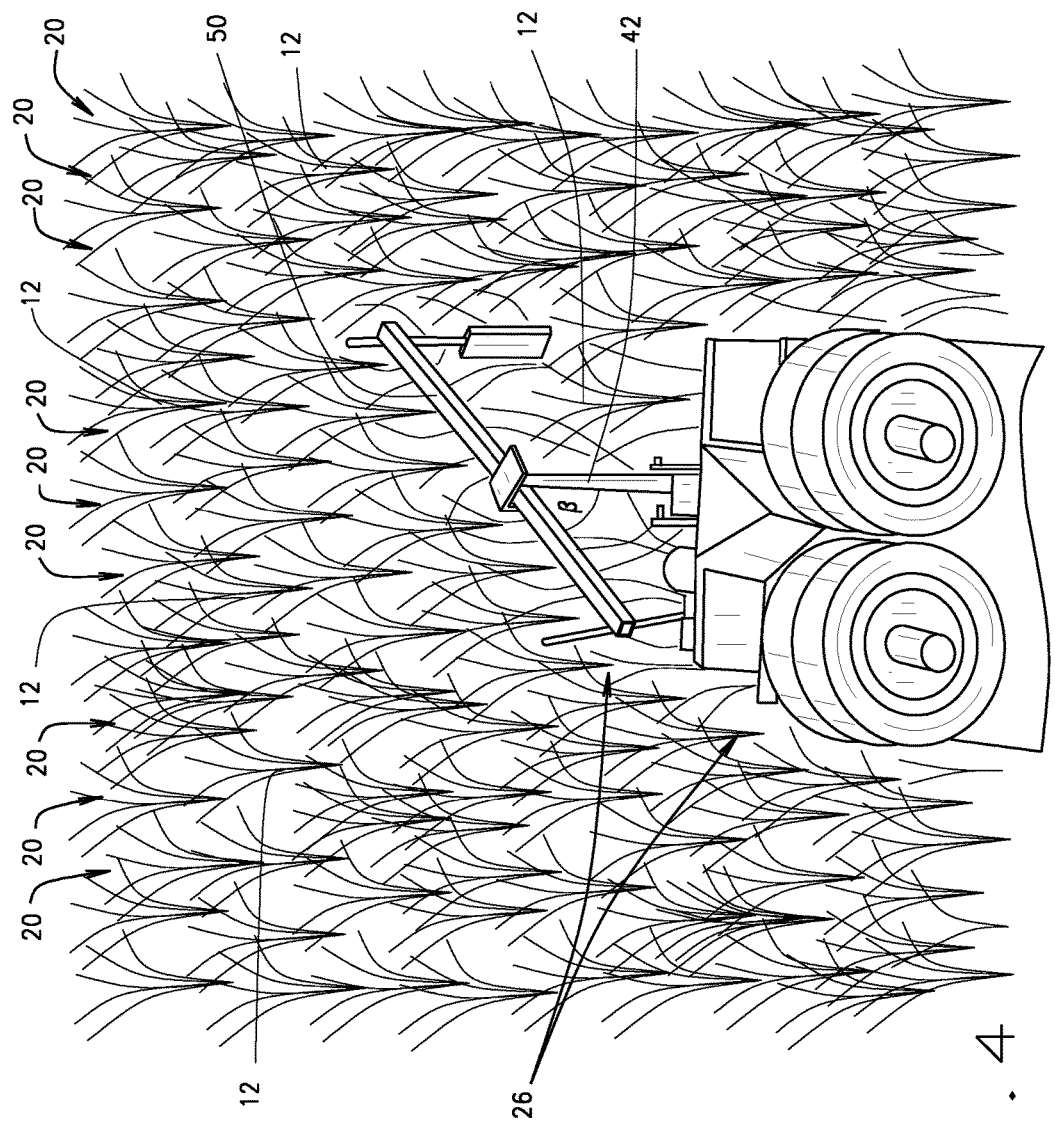
FIG. 4 is a view of a portion of a detasseling assembly of the detassler system shown in FIGS. 1, 2 and 3, as the mobile system moves down a row of plants in a test plot, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

It will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

As used herein, a test plot will be understood to mean a single small field, or one of a plurality plots within a research field that has been subdivided into a plurality of plots. Each test plot typically comprises one or more rows of plants comprising 5-15 plants in each row, wherein the plants are subject to various crop breeding and analytics research procedures and tests for developing various strains, hybrids, genotypes, etc. of plants. For example, test plots in a growing area can receive certain treatments (e.g. chemical applications to the plants and/or growing environment), and/or can comprise plants of certain genetics, and/or combinations thereof. Each test plot within a field is purposely separated from other test plots by a gap, or alleys, where no plants are grown. The gaps or alleys maintain the identity of the plant material within each respective test plot. Hence, there are typically many alleys in a research field, often comprising 10-30 feet of space with no plants.

In various implementations, the devices/apparatuses/systems and methods described herein can be implemented by one or more computer programs executed by one or more processors. In such instances, the computer programs include processor executable instructions that are stored on a non-transitory, tangible, computer-readable medium. The computer programs can also include stored data. Non-limiting examples of the non-transitory, tangible, computer-readable medium are nonvolatile memory, magnetic storage, and optical storage.

Referring to FIGS. 1, 2, 4 and 6, in various embodiments, the present disclosure provides a mobile system 10 for detasseling plants 12 in a test plot 14. As described above, detasseling a plant 12, e.g., a corn plan, involves cutting the leaves off the top portion of the plant, letting the plant (particularly the tassel) grow until it emerges past the cut portion (e.g., 24 to 48 hours later), and then pulling the tassel off/out of the plant. Typically, the tassels of the plants 12 in one test plot 14 are removed so that they do not pollinate other plants in the growing area.

The mobile system 10 generally comprises a mobile platform 16 and a detasseler system 18 mounted to the mobile platform 16. In various embodiments, the mobile system 10 can comprise a plurality of detasseler systems 18, e.g., 2, 3, 4 or more detassler systems 18, however, for simplicity and clarity, only a single detasseler system 18 will be described herein. The mobile platform 16 is structured and operable to move through a test plot 14 comprising at least one row 20 of plants 12 having a plurality of plants 12 therein (e.g., 5-15 plants). The mobile platform 16 can be manually moved (e.g., pushed) through the test plot 14 or motorized to be propelled through the test plot 14 via a prime mover (e.g., an internal combustion engine, and/or an electric motor, etc.). When motorized, movement and control of the mobile platform 16 through the test plot 14 can be manually and/or automatically and/or remotely controlled.

The detasseler system 18 is structured and operable to detassel the plants 12 in a single row 20 of plants 12 as the mobile platform 16 traverses the test plot 14. More particularly, as described above, initially the mobile platform 16 moves the detassler system 18 through the test plot 14 whereby (as described further below) the top portion of the plants 12 are cut off. Subsequently, (e.g., after 24 to 48 hours) the mobile platform 16 again moves the detassler system 18 through the test plot 14 whereby (as described further below) the tassels of the plants 12 that have emerged above the cut off portion of the plants 12 is pulled off, or out, or otherwise removed. This 2-step process of cutting the tops off the plants 12 and then subsequently removing the tassels is comprehensively referred to herein as detasseling the plants 12.

Referring now to FIGS. 1, 2, 3 and 4, in various embodiments, each detasseler system 18 of the mobile system 10 comprises a lift assembly 22 connected to the mobile platform 16 and a detasseling assembly 26 connected to the lift assembly 22. The lift assembly 22 is structured and operable to raise and lower the detasseling assembly 26, as described herein, such that a height above the ground of the detasseling assembly 26 is quickly adjusted, as the mobile platform 16 moves through the test plot 14, to position a cutter/puller head assembly 30 of the detasseling assembly 26 at an appropriate height for each respective plant 12 such that only a desired amount of the top of each plant 12 is cut off and the subsequently grown respective tassel is removed. Specifically, operation of the lift assembly 22 is controlled by a computer based central controller 34 (as are the operation of various other systems, mechanisms, assemblies, devices, etc. of the mobile system 10) to raise or lower the cutter/puller head assembly 30, in real time, based on the height of the next plant 12 in the respective row 20 to be operated on (i.e., have the top cut off or the tassel removed), such that only a desired amount of the top of each respective plant 12 in the row 20 is cut off and the subsequently grown respective tassel is removed by the cutter/puller head assembly 30. The next plant 12 in the respective row 20 to be operated on (i.e., have the top cut off or the tassel removed) will be referred to herein as the target plant 12. Hence, each plant 12 in a row 20 of plants will momentarily be a target plant (i.e., the next plant to be operated on) as the system 10 moves along the respective row 20 and traverses the respective test plot 14.

The central controller 34, as described herein, can be any general-purpose computer comprising electronic memory (shared, dedicated or group), e.g., a hard drive, external flash drive, 'Cloud' based storage, or other electronic memory device, and a processor suitable for executing one or more plant analytics programs, algorithms, routines and/or other code (hereafter referred to simply as the plant analytics software) that can utilize height sensor data, received location data (e.g., the GPS data), received electronic instructions, and/or other captured data to raise and lower the detasseling assembly 26 (via the lift assembly 22), record and analyze the data, map the location of each plant, make plant selection decisions, determine any desired course of action and carry out such actions as the system 10 travels down or over the rows of plants 12. Alternatively, it is envisioned that the central controller 34 can comprise any other computer based system or device disposed on the mobile platform 16 or remotely from the mobile platform 16 such as a smart phone, hand held computer, tablet or other computer based system/device that comprises memory and a processor capable of executing the plant analytics software. Additionally, it is envisioned that the central controller 34 can comprise any combination of a general-purpose computer (as described above), any other computer based system or device (as described above), and one or more application specific integrated circuits (ASICs), electronic circuits, combinational logic circuits, field programmable gate arrays (FPGA), or other hardware components that provide various functionality of the system 10, as described herein. The term code, as used herein, can include software, firmware, and/or microcode, and can refer to one or more programs, routines, functions, classes, and/or objects.

Referring particularly to FIGS. 2, 3, 4, 5 and 6, the detasseling assembly 26 is structured and operable to provide plant presence and height information to the central controller 34 and to detassel the plants 12 in a single row 20 of plants 12 in a test plot as the mobile platform 16 and the respective detasseler system 18 is moved through the respective test plot 14. More particularly, the detasseling assembly 26 comprises an angled sensor bar assembly 38 that is structured and operable to detect, and communicate to the central controller 34, the presence of a target plant 12 in front of the mobile platform 16 in the respective row 20 of plants 12 being operated on, and if a target plant 12 is detected, sense the location of the top of the target plant 12 (e.g., determine the height above the ground of the top of the target plant 12). Then utilizing the information received from the angled sensor bar assembly 38, the central controller 34 will control the lift assembly 22 to raise or lower the cutter/puller head 30 after operating on a present target plant 12, and prior to operating on a subsequent target plant 12 such that the top each respective plant 12 in the respective row 20 is cut at the proper height and the subsequently grown tassel is removed.

In addition to the cutter/puller head assembly 30 and the angled sensor bar assembly 38, the detasseling assembly 26 includes a sensor boom 42 that is fixedly connected at a proximal end to the lift assembly 22. The angled sensor bar assembly 38 is mounted at or near an opposing distal end of the sensor boom 42. In various embodiments, the sensor boom 42 can comprise a single beam or bar. Alternatively, in various other embodiments the sensor boom 42 can be a parallel bar system that comprises an upper bar and lower bar of equal length, both pivotally connected a proximal end to a respective proximal stud, and both pivotally connected at a respective distal end to a distal stud such that the upper and lower bars are disposed parallel to each other, and the proximal and distal studs are parallel to each other. Accordingly, the distal ends of the upper and lower bars can be moved up and down with respect to proximal ends and the upper lower bars will remain parallel to each other, and the proximal and distal studs will remain parallel to each other. In such parallel bar embodiments the angled sensor bar assembly 38 is mounted to the distal stud. Therefore, as a result of the structure and operation of parallel bar sensor boom 42, the height of the angled sensor bar can be raised and lowered by raising or lowering the distal stud with respect to the proximal stud, without altering an orientation or angular disposition of the angled sensor bar assembly 38 with respect to the ground. In such parallel bar embodiments the detasseling assembly 26 can include a boom lift mechanism 46 that is structured and operable to controllably (i.e., as controlled by the central controller 34) raise and lower the sensor bar assembly 38.

In various embodiments, the angled sensor bar assembly 38 comprises a sensor bar 50 and a sensor system 54 connected at or near at least one end of the sensor bar 50. The sensor bar 50 is connected to or near the distal end of the sensor boom 42 at an angle such that a non-orthogonal angle β is defined between the sensor bar 50 and the sensor boom 42. The sensor system 54 is structured and operable to detect the presence of a plant 12 within a sensing field of the sensor system 54, and to detect the top of a target plant 12 within the sensing field when the presence of a plant is detected. The sensor system 54 can be any system capable of sensing the presence of a plant 12 in the row of plants 12 presently being operated on, and is within a distance of the front of the mobile platform 16 that is approximately equal to a length of the sensor boom 42. In various implementations, the length of the sensor boom can be approximately 36 inches to 60 inches, e.g. approximately 48 inches. For example, in various embodiments, the sensor system 54 can be an optical based system, a magnetic based system, a sonic based system, an image based system, a tactile based system, etc. The sensing field of the sensor system is defined herein to be the area (having a length/range, width and height) in which the respective sensor system 54 is capable of sensing the presence of a plant 12, and also capable of sensing the top of each respective plant 12.

The sensor bar 50 has a length such that the opposing ends will be positioned above lanes between adjacent rows 20 of plants 12 when the detasseler system 18 is moved through the test plot 14, via the mobile platform 16, having the sensor boom 42 substantially aligned with the row 20 of plants 12 being operated on. Lanes are defined herein as the longitudinal spaces between and parallel with adjacent rows 20 of plants 12. More specifically, the sensor bar 50 has a length such that the sensor system 54, disposed on one or both ends of the sensor bar 50, is positioned within one or both adjacent lanes of the row 20 of plants 12 being operated on as the detasseling assembly 26 moves along the row 20 of plants 12 being operated on. Accordingly, the sensor system 54 is positioned to be able to sense the presence and height of one or more plants 12 in front of the mobile platform 16, and particularly in front of the cutter/puller head 30, in the row 20 of plants 12 being operated on. For example, in various embodiments, the sensor bar 50 can have a length between 42 inches and 66 inches, e.g., 54 inches.

Importantly, the angle β is such that, in cooperation with the length of the sensor bar 50, as the detasseling assembly 26 is moved along the row 20 of plants 12 being operated on, a plurality of plants 12 within the row 20 of plants 12 being operated on (e.g., 2, 3, 4 or 5 plants 12) will simultaneously be within the sensing field of the sensor system 54 until the angled sensor bar assembly 38 moves past the end of the respective row 20 and into an alley. Therefore, should a plant 12 in the row 20 of plants 12 being operated on be substantially shorter than the other plants 12 in the row, or should a plant 12 be missing in the respective row 20, in which case it is not desirable for the detasseling assembly 26 to attempt to detassel the short or missing plant 12, the sensor system 54 will not communicate to the central controller 34 that a cutter/puller head assembly 30 should be lowered in anticipation that the next target plant 12 is substantially shorter, thereby preventing damaging the plant 12 presently being operated on. Additionally, the higher density of plants 12 within the sensing field of the sensor system 54 allows the central controller 34 to stabilize the position of cutter/puller head assembly 30 with regard to the tops of the plants 12.

The angle β can be any non-orthogonal angle that, based on the length of the sensor bar 50, positions the sensor system 54 within at least one of the lanes adjacent the row 20 of plants 12 being operated on such that the sensing field has a non-orthogonal angle with respect to the respective row 20, whereby a plurality of plants 12 are simultaneously within the sensing field. For example, in various embodiments, the angle β can between 20° and 80°, e.g., between 60° and 70°. In various embodiments, the sensor bar 50 can be fixedly connected to the sensor boom 42 such that the angle β is fixed. Alternatively, in various embodiments, the sensor bar 50 can be pivotally connected to the sensor boom 42 at a sensor bar axis of rotation such that the sensor bar assembly 38 can be pivoted about the sensor bar axis of rotation to change the non-orthogonal angle β so that more, or fewer, plants 12 will simultaneously be within the sensing field of the sensor system 54 as the system 10 proceeds along the respective row 20 of plants 12. It is envisioned that in such embodiments, the angle β can be manually adjusted or automatically adjusted (e.g., adjusted via a motor or other suitable automatic adjustment device).

Figure 5:
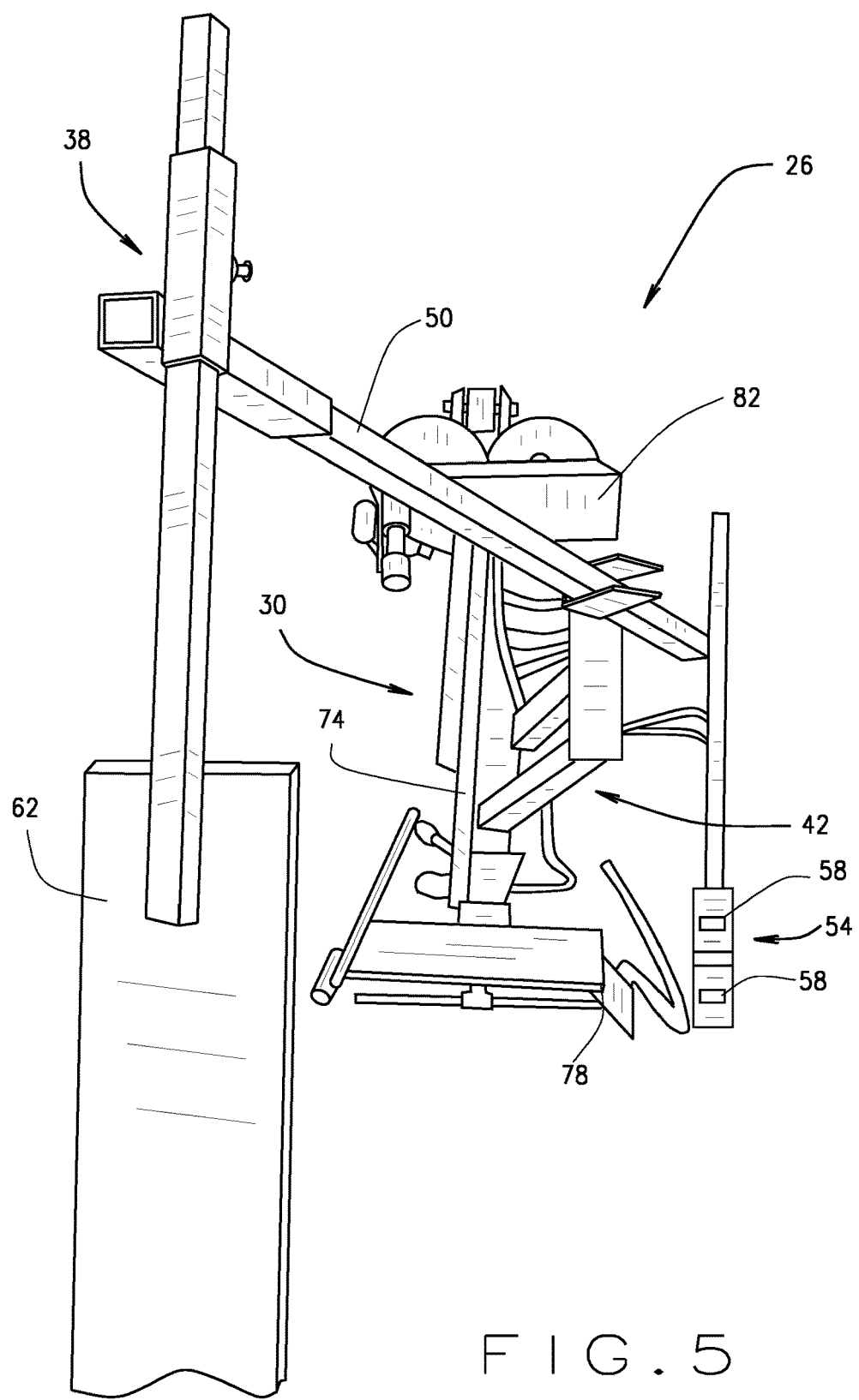
FIG. 5 is a front view of the detasseling assembly of the detassler system shown in FIGS. 1, 2 and 3, in accordance with various embodiments of the present disclosure.
Figure 6:
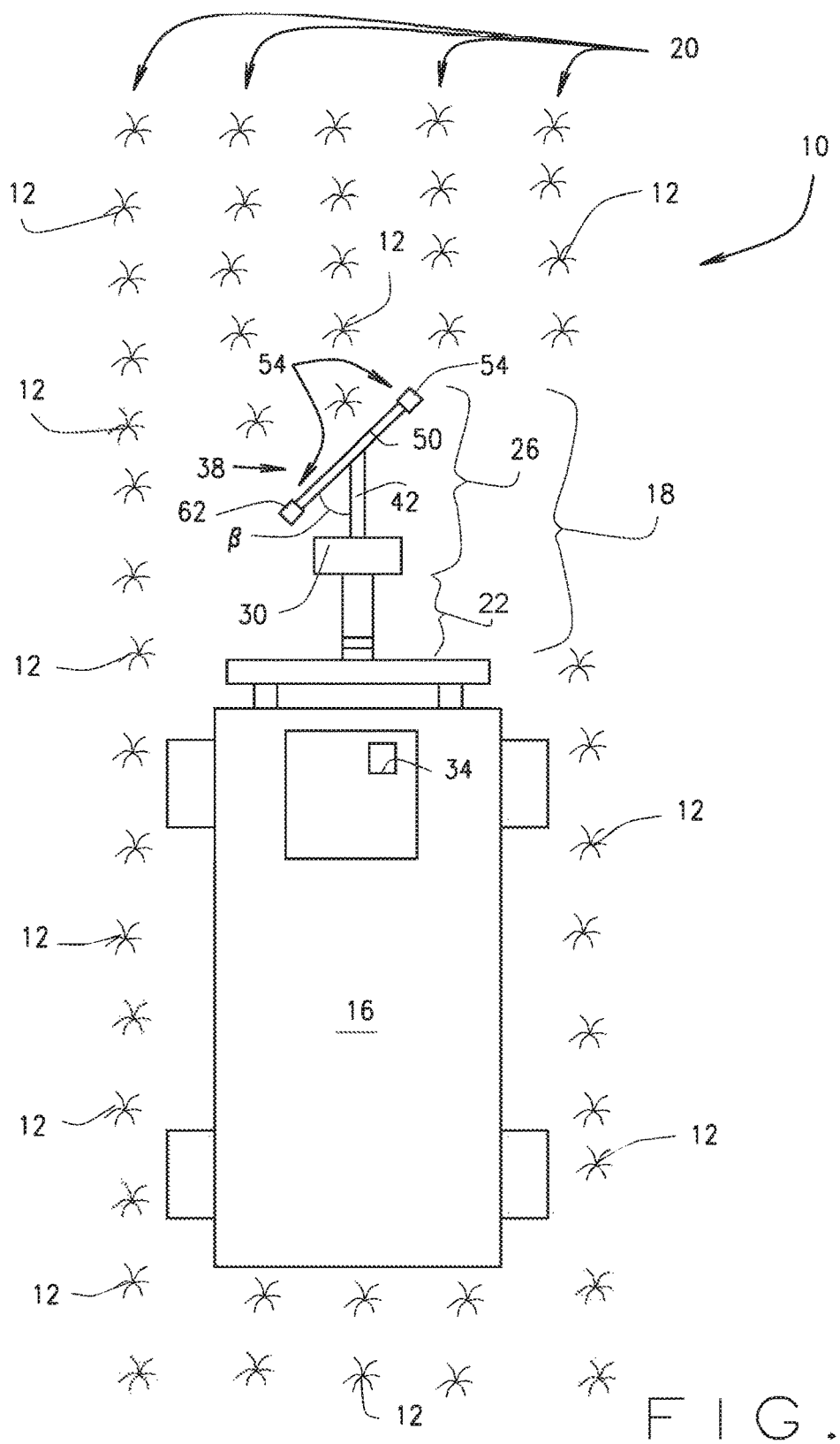
FIG. 6 is a block diagram of the mobile system shown in FIG. 1, in accordance with various embodiments of the present disclosure.

As best illustrated in FIG. 5, in various embodiments, the sensor system 54 comprises at least one light emitting transceiver 58, e.g., at least one infrared (IR), or laser beam, transceiver, that is connected at a first end of the angled sensor bar 50, and at least one optical reflector 62 connected at an opposing second end of the angled sensor bar 50. The reflector 62 can comprise any suitable reflective surface such as reflective tape, reflective plastic, a mirror, etc. In such embodiments, the length of the sensor bar 50 and the non-orthogonal angle β is such that, as the mobile platform 16 moves through the test plot, the at least one transceiver 58 is disposed within a first lane on a first side of the single row 20 of plants 12 being operated on and the at least one reflector 62 is disposed within a second lane on an opposing second side of the single row 20 of plants 12 being operated on. Thus, a plurality of plants 12 in the single row 20 are simultaneously within the sensing field between the at least one transceiver 58 and the at least one reflector 62. The sensing field is a line-of-sight, or area-of-sight, between the transceiver(s) 58 and the reflector(s) 62. As described above, the transceiver(s) is/are communicatively (e.g., wired or wirelessly) to the central controller 34. In such embodiments, each transceiver 58 comprises an emitter that is structured and operable to emit beam of light toward the reflector 62, and a receiver structured and operable to receive any portion of the emitted light reflected back from the reflector 62. If reflected light is received, the transceiver 58 communicates to the central controller 34 that there is no plant 12 present within the sensing field. If no reflected light is received, the transceiver communicates to the central controller 34 that there is at least one plant present within the sensing field. If at least one plant 12 is sensed, the central controller 34 can control raising the sensor bar assembly 38 and the cutter/puller head assembly 30 until the reflected light is received indicating that transceiver 58 has been raised to a height that is just above the top of the group of plants 12 within the sensing field. Once the top of the plants 12 is sensed, the central controller 34 can raise or lower, via the lift assembly 22, the cutter/puller head assembly 30 to a desired height to detassel the respective target plant 12.

Conversely, if no plant 12 is sensed, the central controller 34 can control lowering the sensor bar assembly 38 and the cutter/puller head assembly 30 until the reflected light is no longer received indicating that transceiver 58 has been lowered to a height that is at the top of the group of plants 12 within the sensing field. Once the top of the plants 12 is sensed, the central controller 34 can raise or lower, via the lift assembly 22, the cutter/puller head assembly 30 to a desired height to detassel the respective target plant 12. Alternatively, in various implementations, if no plant 12 is sensed, the central controller 34 can delay lowering the sensor bar assembly 38 and the cutter/puller head assembly 30 for a particular period of time. If a plant 12 is sensed within the delay period, the central controller 34 can raise the sensor bar assembly 38 and the cutter/puller head assembly 30 until the reflected light is received indicating that transceiver 58 has been raised to a height that is just above the top of the group of plants 12 within the sensing field. Once the top of the plants 12 is sensed, the central controller 34 can raise or lower, via the lift assembly 22, the cutter/puller head assembly 30 to a desired height to detassel the respective target plant 12.

Figure 7:
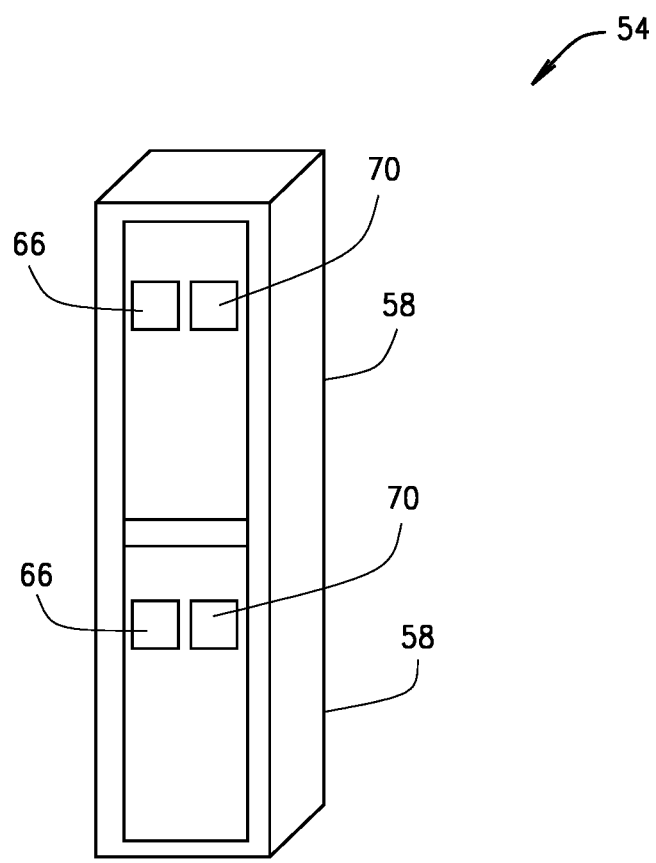
FIG. 7 is a schematic of vertically stacked, positioned and oriented transceivers of a sensor system of the detasseling assembly shown in FIG. 4, in accordance with various embodiments of the present disclosure.

Referring now to FIG. 7, in various embodiments, the at least one light emitting transceiver 58 comprises a pair of light emitting transceivers 58. As described above, each transceiver 58 comprises an emitter 66 that is structured and operable to emit beam of light toward the reflector 62, and a receiver 70 structured and operable to receive any portion of the emitted light reflected back from the reflector 62. In various implementations, the pair of transceivers 58 are vertically positioned/oriented and/or vertically stacked with regard to each other. That is, each transceiver 58 is oriented such that opposing longer sides of each transceiver 58 are oriented substantially vertically with respect to the ground, and shorter sides of each transceiver 58 are oriented substantially horizontally with respect to the ground. More particularly, in such implementation, the emitter 66 and receiver 70 of each transceiver 58 are disposed in a horizontal side-by-side relationship with each other. Consequently, the pattern of illumination that the light emitted by the respective emitter 66 takes after it leaves the respective emitter 66 and returns to the respective receiver 70, i.e., the pattern of the sensing field, is a fan shaped pattern that is substantially horizontal, projecting a sensing field that is wider than it is tall. Thus, the substantially horizontal fan shaped sensing field focuses on the top parts of the plants 12 within the sensing field, and does not waste detection resources sensing lower parts of the plant 12 in the sensing field.

In various implementations of the embodiments wherein the transceivers 58 are vertically stacked with regard to each other, emitter 66 and receiver 70 of the top transceiver 58 can be 3 inches to 6 inches (or greater) from the emitter 66 and receiver 70 of the bottom transceiver 58. Moreover, in operation the lower transceiver 58 must sense the presence of a plant 12 within its respective sensing field or the central controller 34 will lower, via the lift assembly 22, the cutter/puller head assembly 30 until the lower transceiver 58 senses the presence of a plant 12 within its respective sensing field. Conversely, the upper transceiver 58 must sense no presence of a plant 12 within its respective sensing field or the central controller 34 will raise, via the lift assembly 22, the cutter/puller head assembly 30 until the upper transceiver 58 senses no presence of a plant 12 within its respective sensing field.

Figure 8:
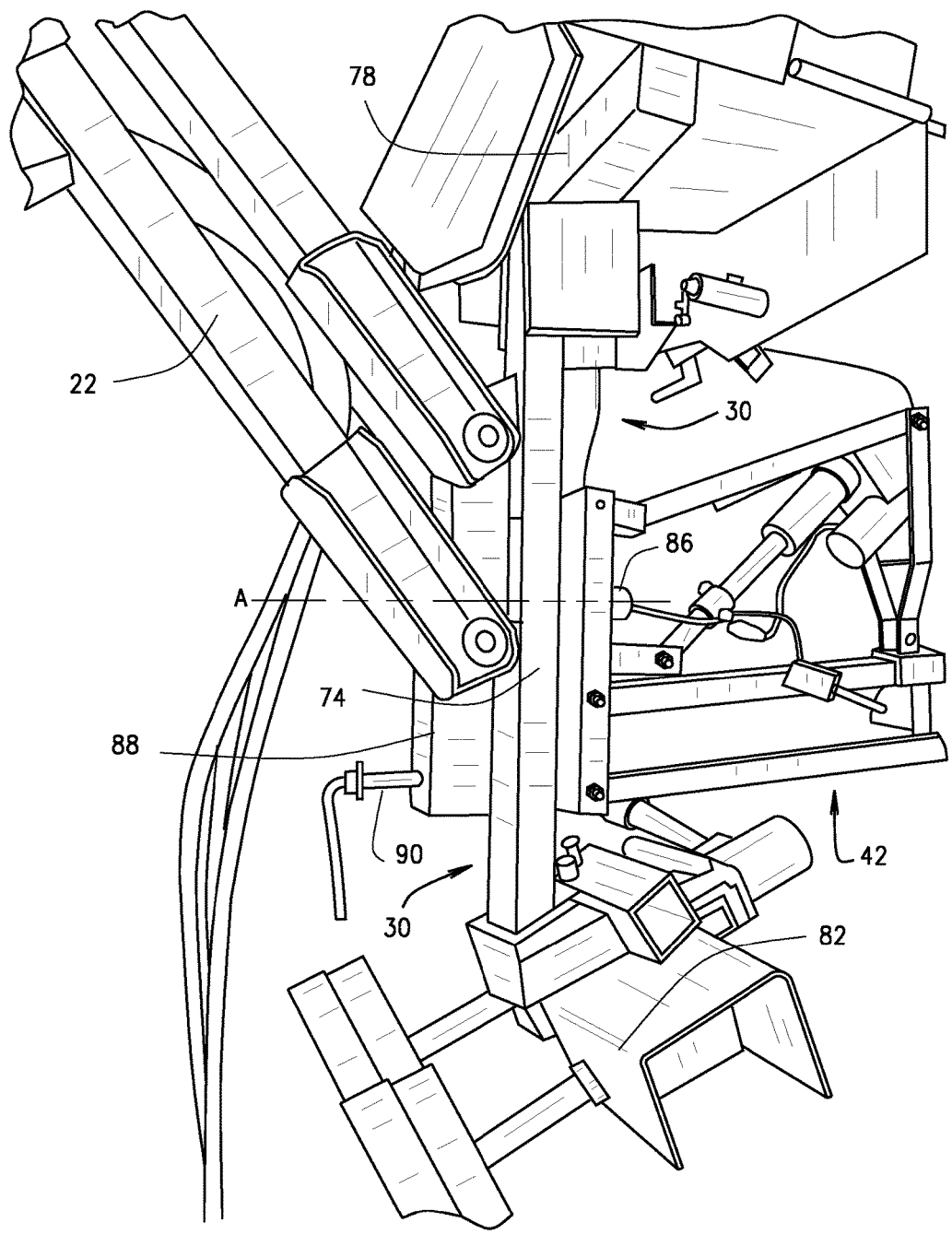
FIG. 8 is a side view of a cutter/puller head assembly of the detassler system shown in FIG. 3, in accordance with various embodiments of the present disclosure.
Figure 9:
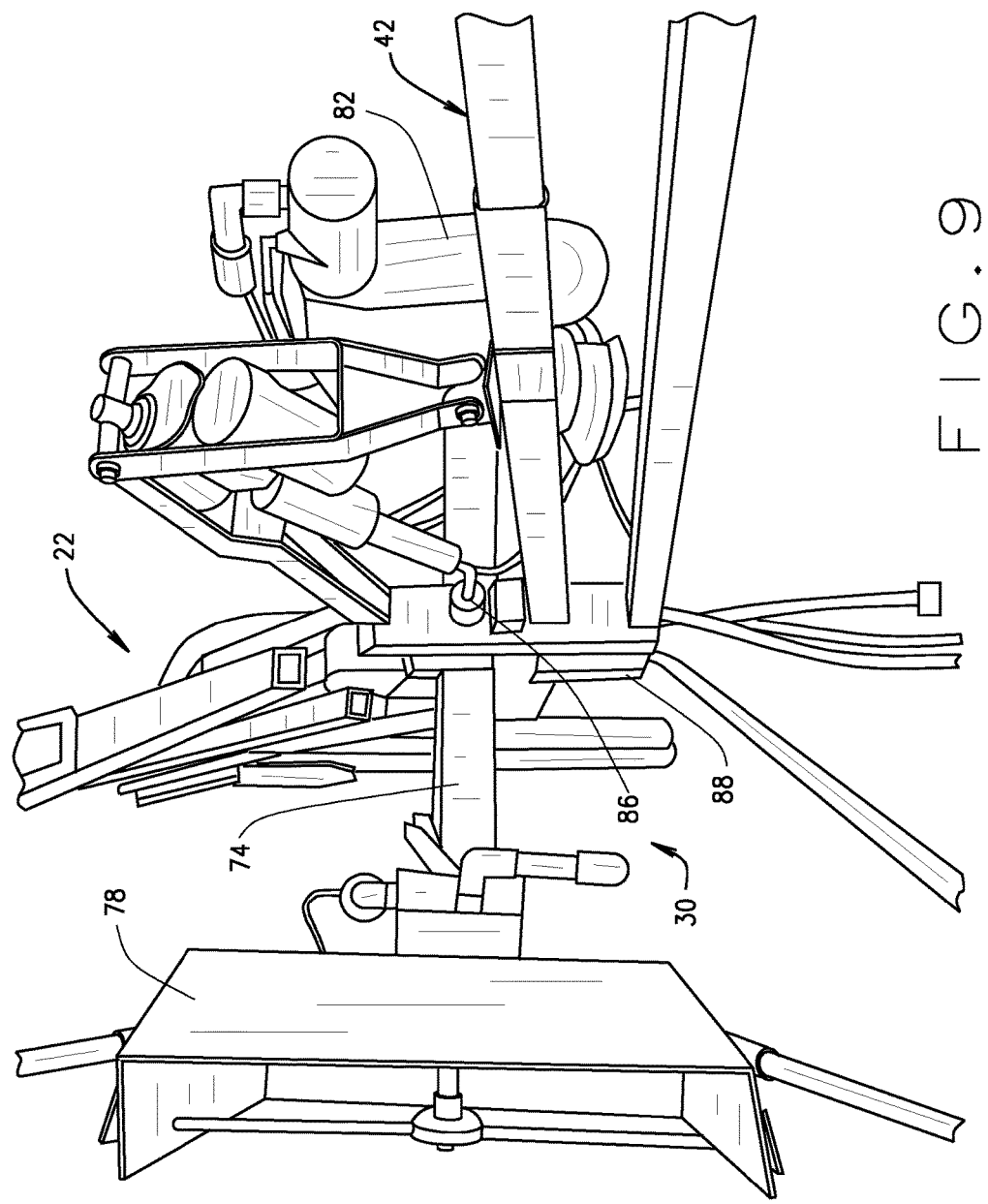
FIG. 9 is a front view of the cutter/puller head assembly shown in FIG. 8, illustrating the rotatability of the cutter/puller head assembly, in accordance with various embodiments.

Referring now to FIGS. 5, 8 and 9, in various embodiments, the cutter/puller head assembly 30 comprises a carrier bar 74 connected to the lift assembly 22, a cutter head 78 disposed at a first distal end of the carrier bar 74, and a puller head 82 disposed at an opposing second distal end of the carrier bar 74. The cutter head 78 is structured and operable to cut the top portion of each plant 12, e.g., cut off the leaves of the top portion of the plants 12, as the system 10 traversed the test plot. The puller head 82 is structured and operable to remove the subsequently grown tassels off/out of the plants 12, as the system 10 traversed the test plot again. In various implementations, the carrier bar 74 is rotatably connected to the lift assembly 22 at a carrier bar axis of rotation A such that the cutter/puller head assembly 30 can alternate between a cutter active position (i.e., cutter head 78 down as shown in FIG. 5) and a puller active position (i.e., puller head 82 down as shown in FIG. 8) by rotation of the cutter/puller head assembly 30 about the carrier bar axis of rotation A (as shown in FIG. 9). Generally, to rotate the cutter/puller head assembly 30, the cutter/puller head assembly 30 is raised, via the lift assembly 22, to a desired height and a clamping nut 86 is loosened. Thereafter, the cutter/puller head assembly 30 can easily be rotated (as shown in FIG. 9) to place the desired cutter head 78 or puller head 82 in the respective cutter active position or puller active position. After the desired cutter or puller head 78 or 82 has been rotated to active position, the clamping nut 86 can be tighten to clamp the carrier bar 74 between the lift assembly 22 and a distal end stud 88 of the lift assembly 22 and a proximal end stud of the sensor boom 42 (e.g., the proximal end stud of the parallel bar sensor boom exemplarily described above).

It should be noted that, as described above, in various embodiments, the mobile system 10 can include a plurality of detassler systems 18 arranged side-by-side along the front of the mobile platform 16. In such instances, the carrier bar 74 of each cutter/puller head assembly 30 has to be short enough to permit free rotation of each cutter/puller head assembly 30 without interference from an adjacent detassler systems 18. For example, in various embodiments, the carrier bar 74 can have a length of 30 inches to 42 inches, e.g. 36 inches. Additionally, in various implementations the carrier bar 74 can have a length that limits the range of heights that the cutter head 78 and the puller head 82 can reach on any give plant 12. For example, the carrier bar 74 can have a length (e.g., 36 inches) so that when the cutter/puller head assembly 30 is in its lowest position, the respective cutter head 78 or puller head 82 will contact a respective plant 12 at a minimum height or higher.

Referring now particularly to FIG. 8, in various embodiments, to improve the stability of the cutter/puller head assembly 30 when in the cutter active position and the puller active position, the detasseling assembly 26 includes a locking mechanism 90 that structured and operable to secure the cutter/puller head assembly 30 in each of the cutter active and puller active positions. Particularly, in addition to the clamping nut 86 holding the cutter/puller head assembly in the desired cutter active and puller active positions along the carrier bar axis of rotation, the locking mechanism 90 secures the carrier bar 74 to the distal end stud 88 of the lift assembly 22 at a second location along the length of the carrier bar 74. The locking mechanism 90 can be any locking mechanism, device, system, assembly, etc., that is suitable for securing the carrier bar 74 to the distal end stud 88 of the lift assembly 22 at a second location along the carrier bar 74 that is radially outward from the carrier bar axis of rotation.

For example, in various embodiments, the locking mechanism 90 can comprise a threaded locking pin (e.g., a hand operable threaded locking pin as exemplarily shown in FIG. 8) that extends through the distal end stud 88 of the lift assembly 22 and is threadable into the carrier bar 74 at one of two locations radially outward from the carrier bar axis of rotation. That is, when the cutter/puller head assembly 30 is in the cutter active position, the locking pin is threadable into the carrier bar 74 at a first location between the carrier bar axis of rotation and the cutter head 78. Similarly, when the cutter/puller head assembly 30 is in the puller active position, the locking pin is threadable into the carrier bar 74 at a second location between the carrier bar axis of rotation and the puller head 82. In such embodiments, to rotate the cutter/puller head assembly 30, the cutter/puller head assembly 30 is raised, via the lift assembly 22, to a desired height, the clamping nut 86 is loosened, and the locking mechanism 90 is disengaged (e.g., the threaded locking pin is threadingly disengaged from the carrier bar 74). Thereafter, the cutter/puller head assembly 30 can easily be rotated (as shown in FIG. 9) to place the desired cutter head 78 or puller head 82 in the respective cutter active position or puller active position. After the desired cutter or puller head 78 or 82 has been rotated to active position, the clamping nut 86 can be tightened to clamp the carrier bar 74 between the lift assembly 22 and a distal end stud 88 of the lift assembly 22 and a proximal end stud of the sensor boom 42 (e.g., the proximal end stud of the parallel bar sensor boom exemplarily described above), and the locking mechanism 90 is reengaged (e.g., the threaded locking pin is threadingly engaged with the carrier bar 74).

Figure 10:
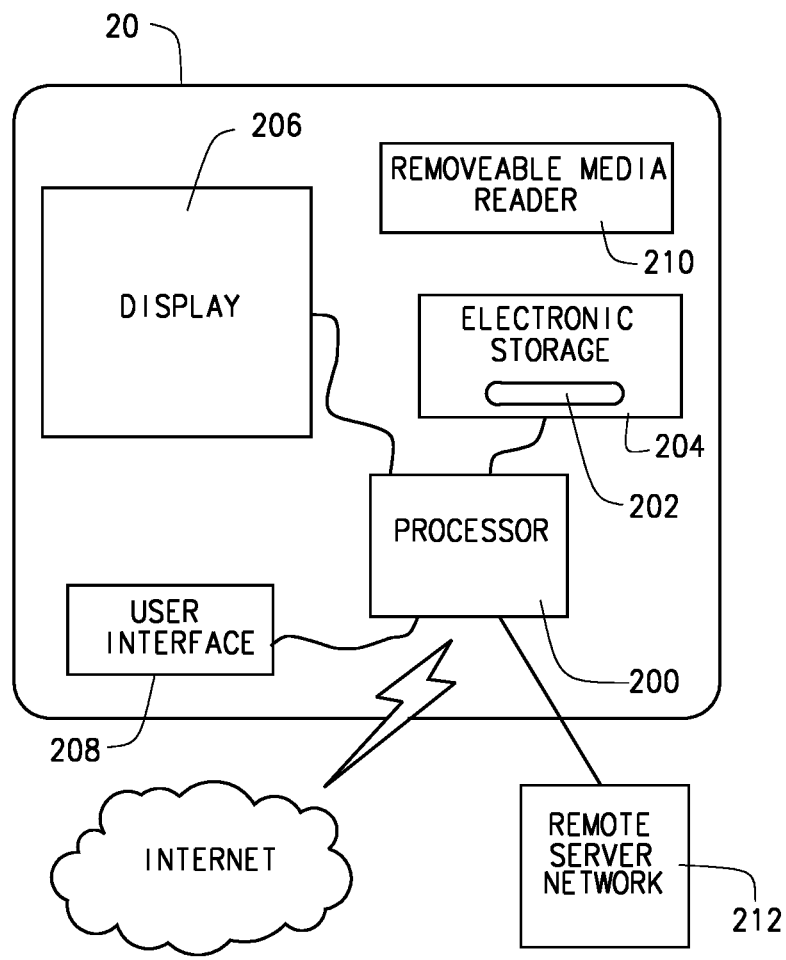
FIG. 10 is a block diagram of a central controller system of the mobile detasseling system shown in FIG. 1, in accordance with various embodiments of the present disclosure.

Referring now to FIG. 10, as described above, the central controller 34 is structured and operable to control one or more automated operations of the mobile detasseling system 10. For example, in various embodiments, the central controller 34 can entirely control or control in part, via communication with other control devices of the system 10, the automated operations of the lift assembly 22 and the detasseling assembly 26. More particularly, the central controller 34 is computer based system that includes one or more computers, controllers, programmable circuitry, electrical modules, etc. that can be located at various locations of the system 10. In various embodiments, the central controller 34 comprises one or more processor 200 structured and operable to execute one or more plant analytics software, programs, algorithms, and/or code (referred to herein simply as plant analytics software 202), whereby operations of the in lift assembly 22 and the detasseling assembly 26, and various other features, functions, systems, devices, assemblies, etc., of the system 10 can be controlled.

In various implementations, the central controller 34 additionally includes at least one electronic storage device 204 that comprises a computer readable medium, e.g., non-transitory, tangible, computer readable medium, such as a hard drive, erasable programmable read-only memory (EPROM), electronically erasable programmable read-only memory (EEPROM), read-write memory (RWM), etc. Other, non-limiting examples of the non-transitory, tangible, computer readable medium are nonvolatile memory, magnetic storage, and optical storage. Generally, the computer readable memory can be any electronic data storage device for storing such things as the various software, programs, algorithms, code, digital information, data, look-up tables, spreadsheets and/or databases, etc., used and executed during operation the system 10, as described herein. Furthermore, in various implementations, the central controller 34 can include at least one display 206 for displaying such things as information, data and/or graphical representations, and at least one user interface device 208 such as a keyboard, mouse, stylus, and/or an interactive touch-screen on the display 206. The user interface 208 is structured and operable to allow a user of the system 10 to input control data and information and retrieve operation status data and information regarding the operation of the system 10.

Still further, in various implementations, the central controller 34 can include a removable media reader 210 for reading information and data from and/or writing information and data to removable electronic storage media such as floppy disks, compact disks, DVD disks, zip disks, flash drives or any other computer readable removable and portable electronic storage media. In various embodiments the removable media reader 210 can be an I/O port utilized to read external or peripheral memory devices such as flash drives or external hard drives. Further yet, in various implementations, central controller 34 can be communicatively connectable to a remote server network 212, e.g., a local area network (LAN) or a wide area network (WAN), via a wired or wireless link. Accordingly, the central controller 34 can communicate with the remote server network 212 to upload and/or download data, information, algorithms, software programs, and/or receive operational commands. Additionally, in various implementations, central controller 34 can be structured and operable to access the Internet to upload and/or download data, information, algorithms, software programs, etc., to and from Internet sites and network servers. In various embodiments, the various software, programs, algorithms, and/or code executed by the processor(s) 200 to control the operations of the system 10 can be top-level system control software that not only controls the discrete hardware functionality of the system 10, but also prompts an operator for various inputs. Various other embodiments can utilize relay logic.

It is envisioned that in various embodiments the mobile detasseling system 10 can additionally include various treatment and solution applicators, and other robotic appendages mounted or connected to the mobile platform 16 for obtaining various data to be analyzed and carrying out any determined course of action (as described below). For example, in various embodiments the robotic appendages can comprise one or more robotic articulating arms having interchangeable tools removably connectable to a distal end thereof for collecting plant, air and/or soil samples and/or carrying out the determined course(s) of action. The interchangeable tools can include such things as a claw for grasping plants, a hypodermic needle injecting plants with a solution (e.g., an infestation solution), a knife pruning plants or removing tissue samples from plant, and/or a leaf tissue punch for removing tissue samples from plants. The interchangeable tools can also include components of an analytics suite such as the ion selective electrodes for testing or sampling soil, optical or electrical conductivity sensors for testing or sampling soil, and DNA detection sensors for testing or sampling soil. Additionally, in various implementations, the treatment and solution applicators can comprises spray nozzle(s), etc., operable to apply selected solutions such as water, pesticides, herbicides, agar solutions, etc., to one or more selected plants 12.

Additionally, in various embodiments it is envisioned that the angle β can be adjusting on the fly the mobile platform 16 moves through a test plot 14 in response to the data that is/has been collected about the particular test plot 14 the mobile platform 16 is moving through.

It is further yet envisioned that in various embodiments, the mobile detasseling system 10 described herein can be combined, in whole or in part, with the automated crop analysis and treatment system described in PCT application number PCT/US2015/045301, titled Apparatus And Methods For In-Field Data Collection And Sampling, filed Aug. 14, 2015, and incorporated herein by reference in its entirety. For example, each detasseling assembly 26 can be one of various interchangeable tools/systems/assemblies that can be fixed to the mobile platform described in the PCT/US2015/045301 application.

Additionally, in various embodiments, it is envisioned that the mobile detasseling system 10, described herein, can be part of a totally automated 'Smart' system, such as the system described in PCT Application PCT/US2015/045301, titled Apparatus And Methods For In-Field Data Collection And Sampling, filed Aug. 14, 2015, and corresponding U.S. Provisional Application 62/037,968, filed Aug. 15, 2014, the disclosure of each being incorporated by reference herein in their entirety. For example, in various embodiments it is envisioned that operation of the system 10 can include one or more of the following actions/tasks/steps. Prior to operation of the system 10 in the field, researchers can upload a set of electronic task specific itinerary instructions, e.g., algorithms, programs, routines, functions, etc., to the central controller 34. The itinerary instructions provide the specific steps and procedures to be implemented in detasseling plants 12 in a particular test plot 14 to be performed by the system 10. As used herein, task will be understood to mean specific functions to be performed by the system 10 at a given time as the system 10 traverses a test plot 14. Hence, for each different task to be performed by the system 10, the researcher can upload different itinerary instructions that provide the specific steps and procedures to be implemented during each different task.

Itinerary instructions could also be uploaded to the central controller 34 that stipulate about how to detassel the plants 12 on a particular day, for that particular task, or for a particular geospatial point in a field. Furthermore, in various embodiments, historical and/or current data about the respective field(s), test plots 14 and plants 12 can be uploaded to, or accessed by, the central controller 34. Moreover, in various implementations, the itinerary instructions can instruct the central controller 34 to take into consideration such historical data previously collected for the respective field(s), plots 14 and plants 12, and then based on this consideration, require execution of special or modified instructions for detasseling the plants 12. Therefore, the historical data can be correlated in real-time with the data presently being collected do determine which, if any, courses of action should be implemented by the system 10. For example, plot names or designations, germplasm and/or pedigrees of each plant 12, row width and planting rates, geospatial data of any plant 12 or point in the test plots 14, previous or planned treatments, geospatial areas in a field known to be contaminated or previously deactivated, etc., can all be correlated in real-time with the detasseling procedure, whereby any stipulated course of action can be determined and implemented as a result of the correlation and as stipulated by the itinerary instructions. In various embodiments, any given geospatial point in the test plots 14 can be assigned values for all the plants 12 system 10 has previously cut and/or removed the tassel at that point.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A detasseler system mountable to a mobile platform, the detasseling system comprising:
   a lift assembly connected to a mobile platform; and
   a detasseling assembly connected to the lift assembly, the lift assembly structured and operable to raise and lower the detasseling assembly, the detasseling assembly structured and operable to detassel the plants in a single row of plants in a test plot as the detasseler system is moved through the test plot, the test plot comprising at least one row of plants comprising a plurality of plants the detasseling assembly comprising:
      a head assembly comprising:
         a carrier bar connected to the lift assembly;
         a cutter head disposed at a first distal end of the carrier bar; and
         a puller head disposed at an opposing second distal end of the carrier bar;
      a sensor boom fixedly connected at a proximal end to the lift assembly; and
      an angled sensor bar assembly connected to sensor boom, the angled sensor bar assembly comprising:
         an sensor bar connected at a midsection thereof to the sensor boom at an angle such that a non-orthogonal angle is defined between the sensor bar and the sensor boom; and
         a sensor system connected to the angle sensor bar, the sensor system structured and operable to detect the presence of a plant within a sensing field of the sensor system, and to detect the top of a target plant within the sensing field when the presence of a plant is detected.

2. The system of claim 1, wherein the sensor bar has a length and the non-orthognal angle between the sensor bar and the sensor boom is such that, as the detasseler system is moved through the test plot, a plurality of plants in the single row of plants are simultaneously within the sensing field of the sensor system.

3. The system of claim 2, wherein the non-orthogonal angle between the sensor bar and the sensor boom is between 20° and 80°.

4. The system of claim 3, wherein the sensor bar is pivotally connected at the midsection thereof to the sensor boom at a sensor bar axis of rotation such that the sensor bar assembly can be pivoted about the sensor bar axis of rotation to change the non-orthogonal angle between the sensor bar and the sensor boom.

5. The system of claim 1, wherein the sensor system comprises:
   at least one transceiver connected at a first end of the angled sensor bar; and
   at least one reflector connected at a second end of the angled sensor bar, and the sensing field is a line-of-sight between the at least one transceiver and the reflector.

6. The system of claim 5, wherein the length of the sensor bar and the non-orthogonal angle between the sensor bar and the sensor boom is such that, as the detasseler system is moved through the test plot, the at least one transceiver is disposed within a first lane on a first side of the single row of plants and the at least one reflector is disposed within a second lane on an opposing second side of the single row of plants, and a plurality of plants in the single row of plants are simultaneously within a line-of-sight between the at least one transceiver and the at least one reflector.

7. The system of claim 6, wherein the sensor system comprises a pair of vertically oriented and vertically stacked transceivers each having an emitter and a receiver, wherein the emitter and receiver are disposed in a horizontal side-by-side relationship with each other.

8. The system of claim 1, wherein the carrier bar is rotatably connected to the lift assembly at a carrier bar axis of rotation such that the head assembly can be alternated between a cutter active position and a puller active position by rotation of the head assembly about the carrier bar axis of rotation.

9. The system of claim 8 wherein the detasseling assembly further comprises a locking mechanism structured and operable to secure the head assembly in each of the cutter active and puller active positions.

10. A mobile system for detasseling plants in a test plot, said system comprising:
   a mobile platform structured and operable to move through the test plot, the test plot comprising at least one row of plants comprising a plurality of plants;
   a detasseler system mounted to the mobile platform, the detasseling system comprising:
      a lift assembly connected to the mobile platform; and
      a detasseling assembly connected to the lift assembly, the lift assembly structured and operable to raise and lower the detasseling assembly, the detasseling assembly structured and operable to detassel the plants in a single row of plants in the test plot as the mobile platform moves through the test plot, the detasseling assembly comprising:
         a head assembly comprising:
            a carrier bar connected to the lift assembly;
            a cutter head disposed at a first distal end of the carrier bar; and
            a puller head disposed at an opposing second distal end of the carrier bar;
         a sensor boom fixedly connected at a proximal end to the lift assembly; and
         an angled sensor bar assembly connected to sensor boom, the angled sensor bar assembly comprising:
            a sensor bar connected at a midsection thereof to the sensor boom at an angle such that a non-orthogonal angle is defined between the sensor bar and the sensor boom; and
            a sensor system connected to the angle sensor bar, the sensor system structured and operable to detect the presence of a plant within a sensing field of the sensor system, and to detect the top of a target plant within the sensing field when the presence of a plant is detected.

11. The system of claim 10, wherein the sensor bar has a length and the non-orthognal angle between the sensor bar and the sensor boom is such that, as the mobile platform moves through the test plot, a plurality of plants in the single row of plants are simultaneously within the sensing field of the sensor system.

12. The system of claim 11, wherein the non-orthogonal angle between the sensor bar and the sensor boom is between 20° and 80°.

13. The system of claim 12, wherein the sensor bar is pivotally connected at the midsection thereof to the sensor boom at a sensor bar axis of rotation such that the sensor bar assembly can be pivoted about the sensor bar axis of rotation to change the non-orthogonal angle between the sensor bar and the sensor boom.

14. The system of claim 10, wherein the sensor system comprises:
   at least one transceiver connected at a first end of the angled sensor bar; and
   at least one reflector connected at a second end of the angled sensor bar, and the sensing field is a line-of-sight between the at least one transceiver and the reflector.

15. The system of claim 14, wherein the length of the sensor bar and the non-orthogonal angle between the sensor bar and the sensor boom is such that, as the mobile platform moves through the test plot, the at least one transceiver is disposed within a first lane on a first side of the single row of plants and the at least one reflector is disposed within a second lane on an opposing second side of the single row of plants, and a plurality of plants in the single row of plants are simultaneously within a line-of-sight between the at least one transceiver and the at least one reflector.

16. The system of claim 15, wherein the sensor system comprises a pair of vertically oriented and vertically stacked transceivers each having an emitter and a receiver, wherein the emitter and receiver are disposed in a horizontal side-by-side relationship with each other.

17. The system of claim 10, wherein the carrier bar is rotatably connected to the lift assembly at a carrier bar axis of rotation such that the head assembly can be alternated between a cutter active position and a puller active position by rotation of the head assembly about the carrier bar axis of rotation.

18. The system of claim 17 wherein the detasseling assembly further comprises a locking mechanism structured and operable to secure the head assembly in each of the cutter active and puller active positions.

19. A plant height measurement system mountable to a mobile platform, said system comprising:
   a lift assembly; and
   a height measuring assembly connected to the lift assembly, the height measuring assembly structured and operable to identify the top of plants in a single row of plants in a test plot as the system is moved through the test plot, the height measuring assembly comprises:
      a sensor boom fixedly connected at a proximal end to the lift assembly; and
      a angled sensor bar assembly connected to sensor boom, the angled sensor bar assembly comprises:
         a sensor bar connected at a midsection thereof to the sensor boom at an angle such that a non-orthogonal angle is defined between the sensor bar and the sensor boom; and
         a sensor system connected to the angle sensor bar, the sensor system structured and operable to detect the presence of a plant within a sensing field of the sensor system.

* * * * *